(12) United States Patent
Beck et al.

(10) Patent No.: US 6,487,473 B1
(45) Date of Patent: Nov. 26, 2002

(54) METHOD AND APPARATUS FOR REAL TIME YIELD CONTROL

(75) Inventors: William Scott Beck, Hollidaysburg, PA (US); Michael Paul Grimm, Tyrone, PA (US); Alan L. Mountain, Imler, PA (US)

(73) Assignee: Seton Company, Norristown, PA (US)

( * ) Notice: Subject to any disclaimer, the term of this patent is extended or adjusted under 35 U.S.C. 154(b) by 0 days.

(21) Appl. No.: 09/389,273

(22) Filed: Sep. 2, 1999

Related U.S. Application Data

(60) Provisional application No. 60/099,017, filed on Sep. 3, 1998.

(51) Int. Cl.[7] ............................................. G06F 19/00
(52) U.S. Cl. .................................... 700/134; 83/522.23
(58) Field of Search ................................. 700/134, 130, 700/135, 131; 83/522.15, 522.16, 522.17, 522.22, 522.23, 522.24, 936; 382/111

(56) References Cited

U.S. PATENT DOCUMENTS

| | | | |
|---|---|---|---|
| 5,363,709 A | 11/1994 | Ives et al. ............ 73/522.23 X |
| 5,663,885 A | 9/1997 | Stahl ........................... 700/134 |
| 5,838,569 A | 11/1998 | Gane ........................... 700/134 |
| 6,157,730 A | 12/2000 | Roever et al. .......... 382/111 X |

*Primary Examiner*—Peter Nerbun
(74) *Attorney, Agent, or Firm*—Webb Ziesenheim Logsdon Orkin & Hanson, P.C.

(57) ABSTRACT

A procedure and a device for determining yield of usable pieces from a raw material when or before the usable pieces are produced. Determination of the area of raw material is automated, and pieces of raw material are encoded with a marking indicating the area and other pertinent information. The use of proximity sensors in combination with cutting dies permits the automation of yield calculation. The results of the yield calculation can be viewed on a real time basis and provide feedback to the production process, preventing low-yield production and facilitating balanced production of pieces. Indicators permit an operator to be signaled to increase production of underproduced pieces.

12 Claims, 6 Drawing Sheets

METHOD AND APPARATUS FOR REAL TIME YIELD CONTROL

This application claims the benefit of U.S. Provisional Application Ser. No. 60/099,017, filed Sep. 3, 1998, entitled "Method and Apparatus For Real Time Yield Control."

BACKGROUND OF THE INVENTION

1. Field of the Invention

This invention relates to the field of automation of process control. In particular, this invention relates to an apparatus for achieving real time yield control of the number and types of usable pieces of desired sizes and shapes obtained from raw material.

2. Description of the Prior Art

Maximizing the yield of usable pieces from raw material has been of interest in industrial production for many years. Factors to be considered include the position and orientation of the pattern of pieces on the raw material, shapes and ratios of types of usable pieces to be produced, and the size, shape and nature of the raw material. The situation becomes particularly complex when natural products are being used, as they are likely to be of irregular shape and are more likely to contain flaws than a manufactured product. Each piece of a natural raw material calls for a separate yield calculation and a different arrangement and assortment of usable pieces is likely to be necessary to maximize yield.

Calculating the yield involves determining the area of the raw material, measuring the area of usable pieces produced and expressing the latter as a percentage of the former. If either the raw material or the usable pieces produced are irregular in shape, the calculations are complex and are best accomplished by a computer.

Current methods of yield calculation commonly require the use of a keypad or keyboard for numerical entry. This procedure introduces a number of difficulties. It is time-consuming and introduces the possibility of data entry error. In addition, a yield value alone does not guide a production worker to increase or decrease production of particular pieces.

Accordingly, a need remains for a process in which the yield of pieces can be determined without any additional processing time, without a delay in obtaining results, with a reduced need for separate data entry steps, and with the capability of providing feedback to the process operator. This invention determines yield in real time, provides instantaneous results to an operator or supervisor, and utilizes automated data entry capabilities.

SUMMARY OF THE INVENTION

In order to meet this need, the present invention is an apparatus and method for achieving real time yield control of the number and types of usable pieces of desired sizes and shapes obtained from raw material. The raw material is laid out and conveyed to a cutting station. Dies in the shapes of desired pieces are placed on the raw material. Areas of raw material encompassed by the dies are calculated and subtracted from the total usable area of raw material to determine the yield. The yield is compared to a designated preset threshold value determined for each job. The pieces are then cut from the raw material.

DETAILED DESCRIPTION OF THE PREFERRED EMBODIMENT

In an important embodiment of the invention, the starting material for the process is a rawhide in russet form. Russet form rawhide is hairless, tanned, and dyed to a color functioning as the undercoat. Each hide is processed by conditioning to soften it in a milling process which employs water. The hide is then spray painted to the desired color. Next, the hide is embossed in a rolling process for the desired grain and sent through a staking process for softening. The area of the hide is then measured electronically and encoded on the hide in the form of a bar code. Defects are then marked on the hide. This can be done by circling or highlighting defects with a crayon-like marker.

Figure 1:
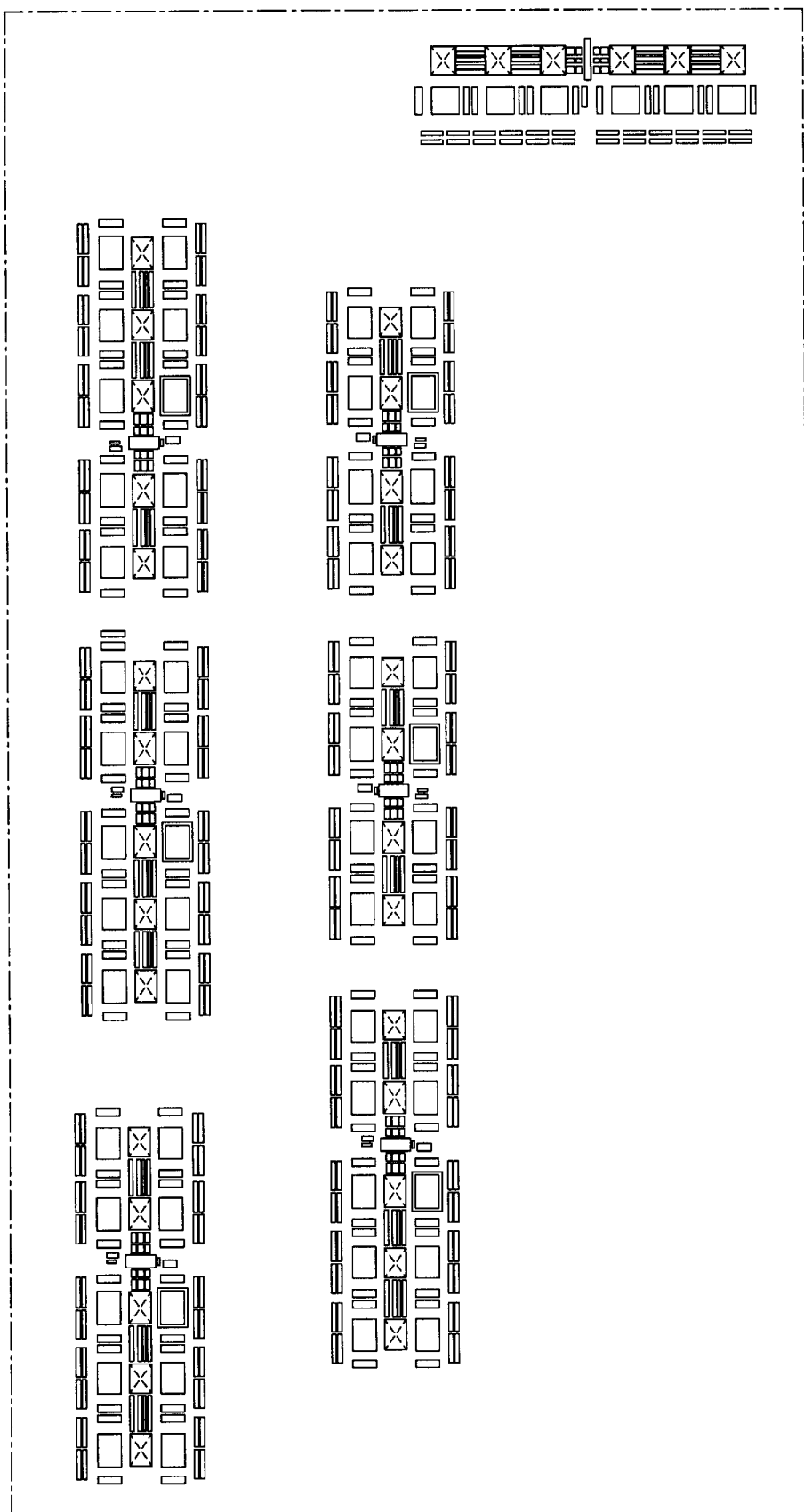
FIG. 1 is a schematic diagram of a facility containing a number of cutting presses, each with cutting stations arranged about it.
Figure 2:
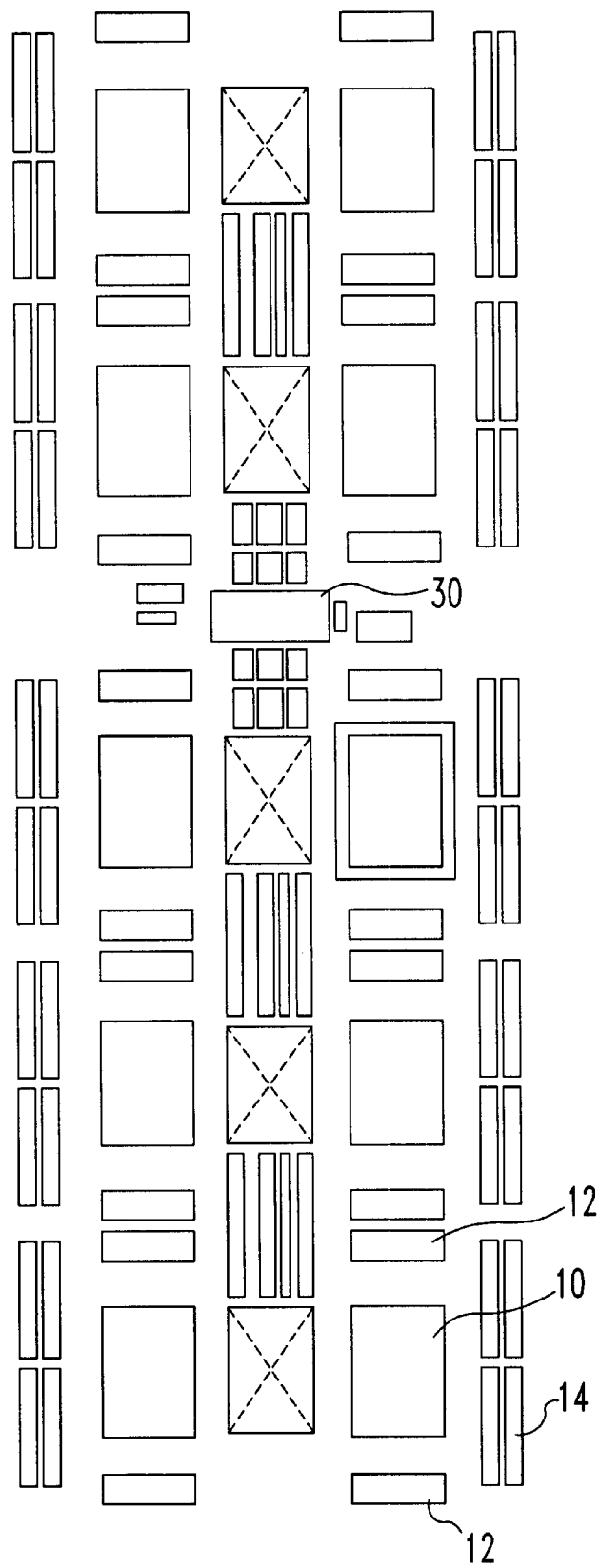
FIG. 2 is a schematic diagram of a cutting press and its associated cutting stations and die racks.
Figure 3A:
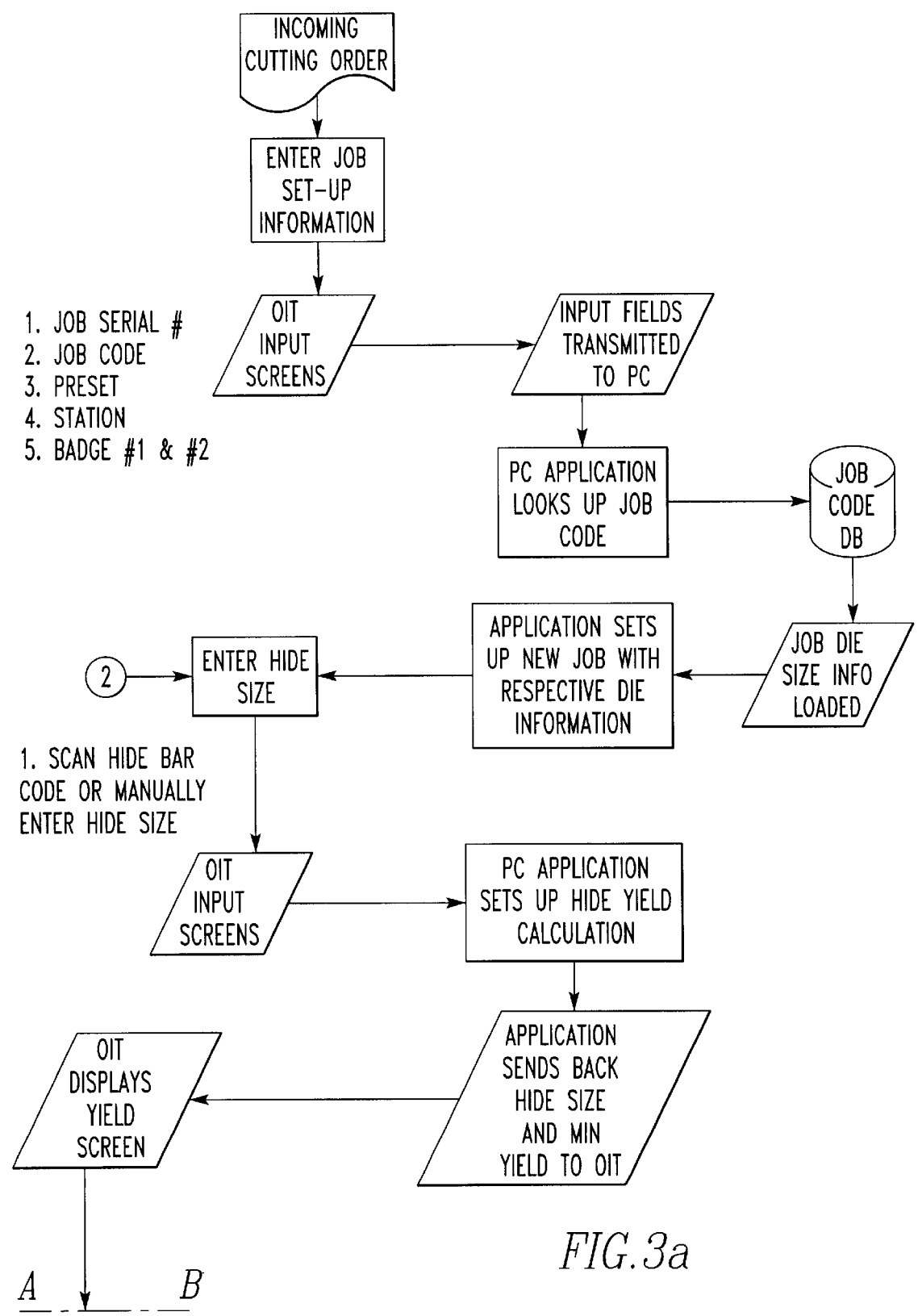
FIGS. 3a and 3b is a flow chart for the real time yield control process.
Figure 3B:
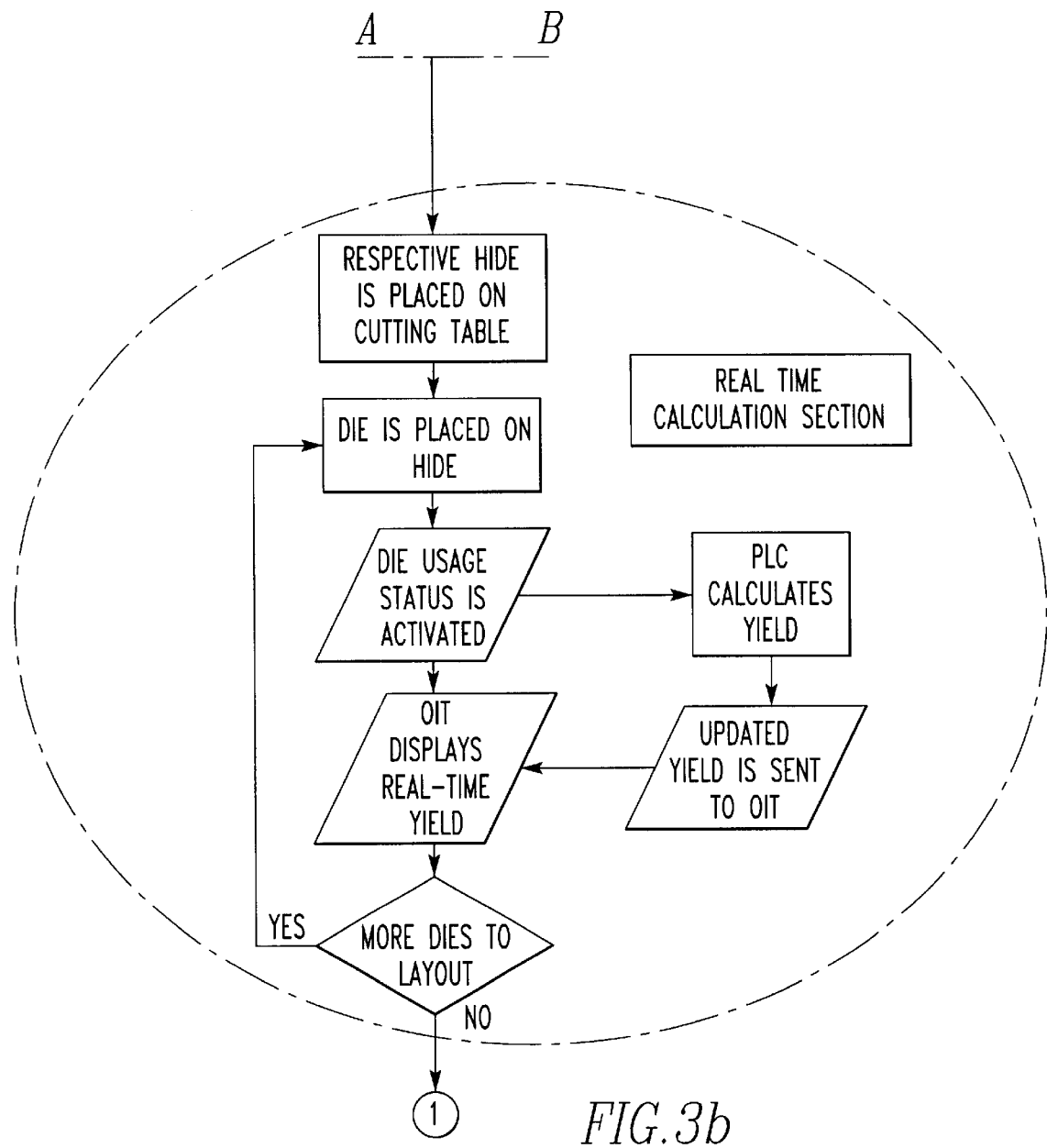
Figure 4:
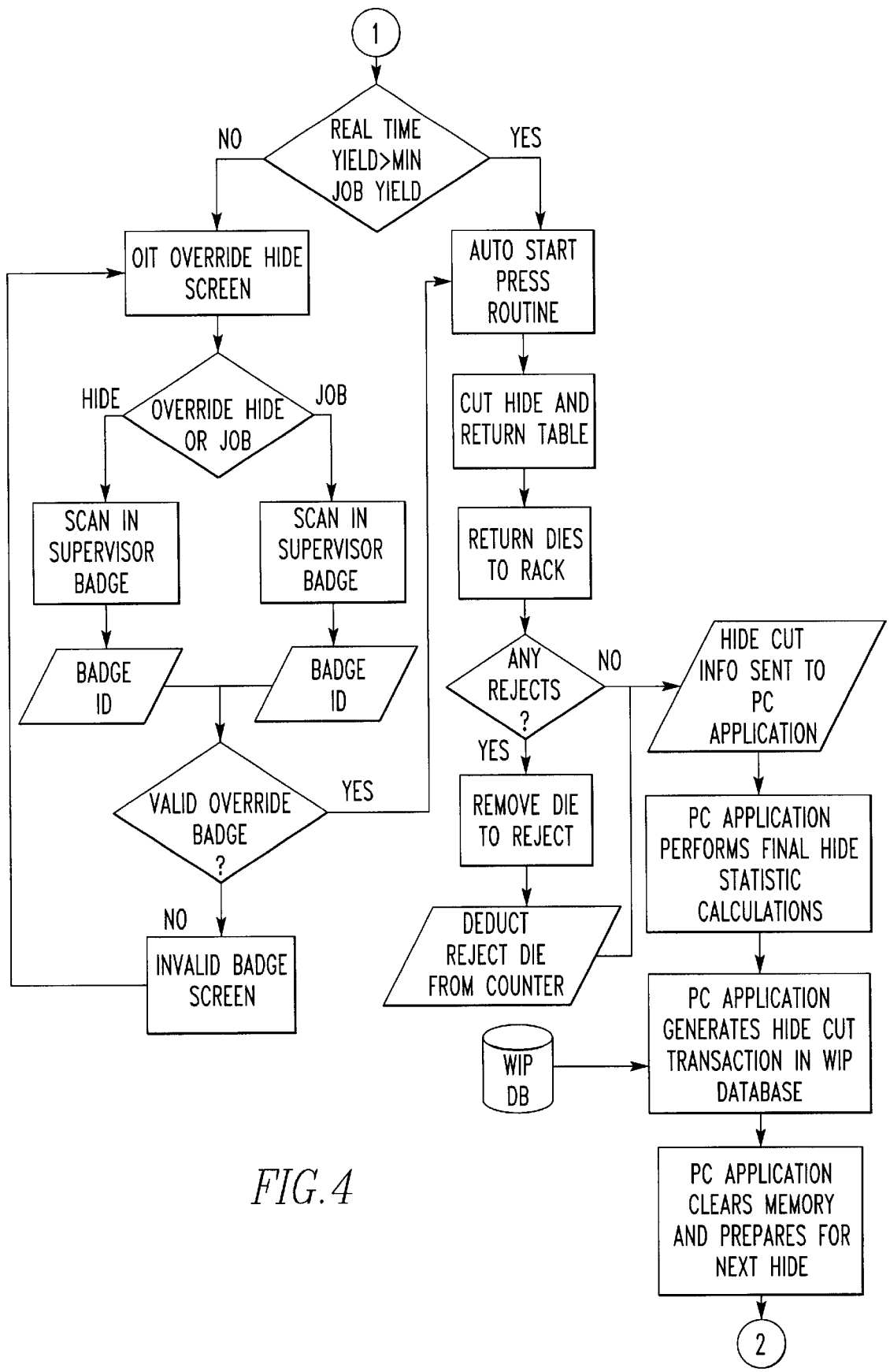
FIG. 4 is a flow chart for the real time calculation of yield.

The hide is then laid on a board, conveyed to a cutting station and placed on a cutting table 10. The cutting station contains die racks 12, a piece table 14, an Operator Interface terminal (OIT), a bar code scanner, a Programmable Logic Controller (PLC) and access to a cutting press 30. One or more cutting stations are arrayed around a cutting press, as shown in FIGS. 1 and 2. The facility contains a number of arrays or press configurations 40, each array containing a hydraulic press, cutting tables, associated die racks and tables. FIGS. 3 and 4 are a flow chart for the automated process making use of these devices.

Die racks are arrangements of shelves containing cutting dies in the sizes and shapes of the desired usable pieces. Each die rack is identified by a job code. The dies are removed from the die racks and placed on the hide by an operator in a configuration maximizing the number of resulting usable pieces. The die racks are fitted with magnetic proximity sensors that are mounted beneath each die. The proximity sensors detect the absence or presence of each die on the die rack, and allow the numbers, sizes and shapes of the dies on the cutting table to be determined. Each proximity sensor is wired to the PLC so that, when a die is removed from a die rack, a signal indicating the removal of the die is sent to the PLC. Each die has a predetermined area, so the signals sent to the PLC can be used to calculate the accumulated area of dies removed from the die rack.

Each cutting station is equipped with a touch screen OIT. The OIT prompts the operator for information and displays information in a real-time fashion. Information can be entered into the OIT through an on-screen keyboard display or through an attached bar code scanner. Information collected by the OIT is stored in the PLC.

The bar code scanner, connected to the PLC, is used for the entry of information prompted by the OIT such as job serial number, job code, the number of sets of pieces to be produced, cutting station ID, operator badge number, downtime codes, and the bar code identifying the hide.

The PLC acts as the organization point for all collected information, accepts information from external data sources, and shares information with a controlling central computer running application software, allowing calculation of yield on a real time basis. Information supplied by the PLC results in determination of the area encompassed by dies in use, calculation of the real time yield, and summation of the number of individual pieces cut.

A controlling central computer is connected to a number of PLCs, allowing real time data acquisition and process control. In the operation of the system, the PLC sends information to the controlling central computer as each die is removed from the die rack. The PLC calculates the total area of all dies removed from the die rack and placed on the hide, and the yield from the hide. This yield calculation can be viewed by the operator as dies are placed on the hide. If the yield exceeds the predetermined threshold yield, the hide can be transported to the cutter press with the dies in place for press cutting, and the cutter press is activated. If the yield does not reach the threshold yield, the cutter press is not activated, and a manual override by an authorized person is required for cutter press operation. Alternatively, the operator can are arrange the dies on the hide to accommodate an additional die so that the threshold yield is exceeded. A flow chart for the real time calculation of yield is shown in FIG. 3.

Another feature of the invention expedites balanced production of parts needed. A light positioned adjacent the die area on the shelf is configured to flicker if the number of pieces produced using the corresponding die is below the number needed for assembly with pieces produced using the other dies. The operator can then increase production of pieces using the indicated die.

The hide is returned to the cutting table after the cutter press is operated and the pieces are removed. The dies are then returned to the die shelves. Each piece produced is inspected for defects, and the OIT prompts the operator for information. If a piece is rejected for defects, the information is entered through the OIT, and the PLC deducts the rejected die cut from the total number of pieces counted. The acceptable pieces are stacked on a series of shelves by like components.

Figure 5:
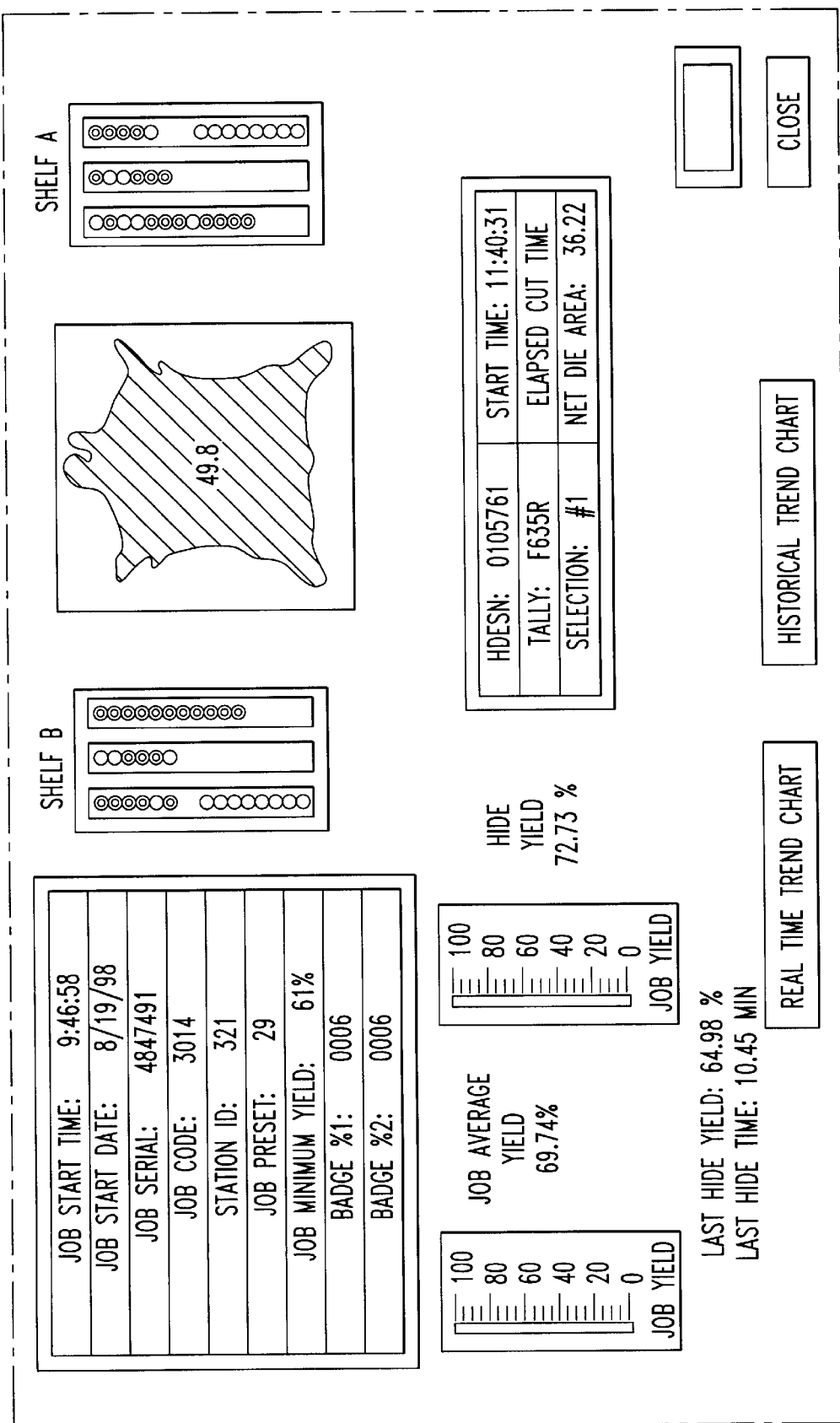
FIG. 5 is a depiction of a computer display screen for monitoring the cutting process.

Personnel with access to the central computer through a personal computer network can view information relating to factors such as cutting orders, job codes, operators, current hide size, current hide yield, job yields and shift yields on a real time basis. A database implemented on the central computer includes this information and additional information including start and end times for processing a hide, hide serial number, tally, net die area, job serial numbers, number of rejects, and reject percentages. A computer display screen for monitoring the cutting process is shown in FIG. 5.

Having described the currently preferred embodiment of the present invention, it is to be understood that the invention may be otherwise embodied within the scope of the appended claims.

We claim:

1. A method for achieving real time yield control of usable pieces obtained from raw material, comprising:
    a) measuring the raw material;
    b) identifying and marking defects, if any, in the raw material;
    c) placing dies on the raw material;
    d) determining the area encompassed by the dies;
    e) calculating the yield obtained from the raw material;
    f) comparing the yield obtained to a predetermined threshold yield; and
    g) activating a cutter press to produce pieces from the raw material.

2. The method of claim 1 in which the raw material is hide.

3. The method of claim 1 in which the raw material is rawhide in russet form.

4. The method of claim 1 in which steps d), e), and f) are carried out by a computer.

5. The method of claim 4 in which the results of calculating the yield and comparing the yield can be viewed on a real time basis.

6. The method of claim 1 in which the yield obtained must exceed the predetermined threshold yield before activating a cutter press occurs.

7. The method of claim 1 in which the raw material measurement determined in step a) is encoded and marked on the raw material.

8. An apparatus for achieving real time yield control of usable pieces obtained from raw material, comprising:
    a) at least one cutting table;
    b) at least one die rack, each located in proximity to a cutting table;
    c) a plurality of cutting dies, each removably housed on a die rack;
    d) a plurality of die areas, each located on a die rack, each capable of housing a cutting die;
    e) at least one Operator Interface Terminal, each located in proximity to a cutting table;
    f) at least one Programmable Logic Controller, each in electronic communication with an Operator Interface Terminal;
    g) at least one bar code scanner, each in electronic communication with a Programmable Logic Controller;
    h) a controlling central computer in electronic communication with each Programmable Logic Controller; and
    i) at least one cutting press, each in electronic communication with the controlling central computer.

9. The apparatus of claim 8, further comprising a plurality of proximity sensors, each proximity sensor located within a die area, each proximity sensor being in electronic communication with a Programmable Logic Controller.

10. The apparatus of claim 8, further comprising a plurality of indicator lights, each indicator light in proximity to a die area.

11. The apparatus of claim 8, further comprising a computer network in electronic communication with the controlling central computer.

12. In an apparatus for achieving real time yield control in which a plurality of cutting dies are used in conjunction with a cutting press, and in which the area of a plurality of cutting dies is used to calculate the yield, the improvement comprising a plurality of proximity sensors, each proximity sensor being in electronic communication with a computer, and each proximity sensor being triggered by the removal of a die and each triggering of a proximity sensor producing a calculation of the area of removed dies and a calculation of yield.

* * * * *